United States Patent [19]

Nordholt et al.

[11] Patent Number: 4,910,769
[45] Date of Patent: Mar. 20, 1990

[54] TELEPHONE LINE INTERFACE CIRCUIT

[75] Inventors: Ernest H. Nordholt; Petrus A. M. Van der Cammen, both of Berkel en Rodenrijs, Netherlands

[73] Assignee: Alcatel Nederland B.V., Gravenhage, Netherlands

[21] Appl. No.: 314,901

[22] Filed: Feb. 24, 1989

[30] Foreign Application Priority Data

Feb. 24, 1988 [NL] Netherlands ............................ 8800475
Jun. 24, 1988 [NL] Netherlands ............................ 8801619

[51] Int. Cl.$^4$ ............................................. H04M 7/04
[52] U.S. Cl. .................................... 379/399; 379/344; 379/398; 340/425
[58] Field of Search ............... 379/399, 402, 403, 344, 379/345, 398; 340/425

[56] References Cited

U.S. PATENT DOCUMENTS 2,659,774 11/1953 Barney ................................. 340/425
4,540,852 9/1985 Albouy et al. .

FOREIGN PATENT DOCUMENTS 197809 9/1978 France ................................. 379/344
0096756 12/1983 France .
2012521 7/1979 United Kingdom .

OTHER PUBLICATIONS

IBM Technical Disclosure Bulletin, "Subscriber Telephone Line Circuit", vol. 8, No. 5, Oct. 1965, p. 727.
21st Electronic Components Conference, "Integrated Circuit Transformers", J. J. Golembeski, Zie Voor Titel Boek; de 2 Pagina, pp. 359–364.
Patent Abstract of Japan, "Hybrid Circuit of Circular Type", Nippon Hoso Kyokai, vol. 1, No. 32, 29, maart 1977.

Primary Examiner—James L. Dwyer
Attorney, Agent, or Firm—Christie, Parker & Hale

[57] ABSTRACT

The invention relates to a telephone line interface circuit for use in switching a call connection between subscriber telephone sets via a switching matrix. The interface circuit is provided with two terminals for connection to a telephone line of a subscriber and two terminals for connection to one side of a switching matrix. The circuit comprises a cascade circuit of a first and a second bidirectional amplifier which are connected to each other via a common point, acting as a one-to-N transformer for speech signals. Also included is a third and fourth bidirectional amplifier for providing direct voltage decoupling and impedance to thereby provide the telephone set with the required line voltage.

11 Claims, 3 Drawing Sheets

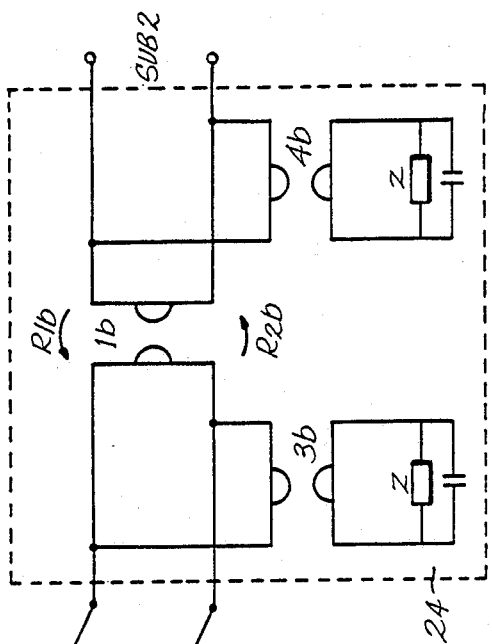
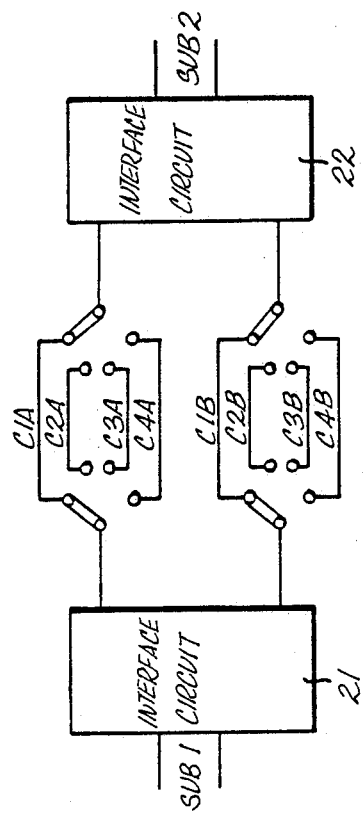
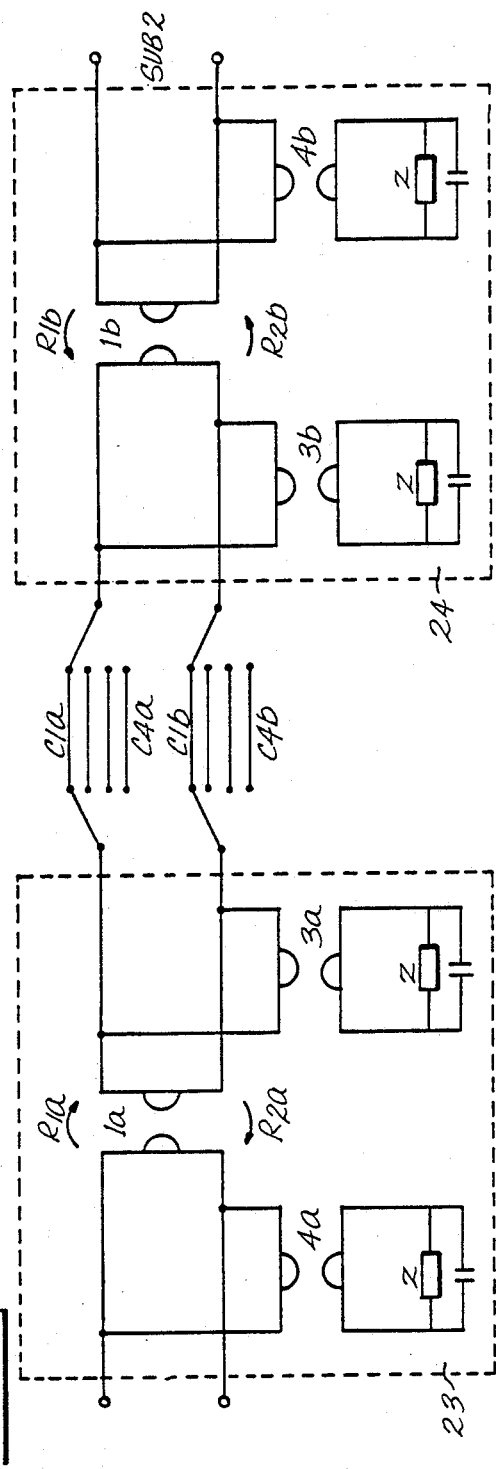
Fig-6
Fig-7

4,910,769

TELEPHONE LINE INTERFACE CIRCUIT

TECHNICAL FIELD

The invention relates to a telephone line interface circuit.

CLAIM FOR PRIORITY

This application is based on and claims priority from two applications first filed in the Netherlands on 2/24/88 and on 6/24/88 under Ser. Nos. 88/00475 and 88/01619 respectively. To the extent such prior application may contain any additional information that might be of any assistance in the use and understanding of the invention claimed herein, it is hereby incorporated by reference.

BACKGROUND ART

For use in switching a call connection between subscriber telephone sets via a switching matrix, which interface circuit is provided with two terminals for connection, optionally via a cable, to a telephone set and with two terminals for connection to one side of the switching matrix. The resultant connection can be switched on and off and is typically used for transmitting speech signals. Such a telephone line interface circuit is known from practical engineering.

For DC decoupling the subscriber telephone set from the switching matrix, large capacitors are used in such circuits in order to make a difference possible in voltage level between the circuits on both sides. As a result, such a circuit cannot be constructed in integrated form.

DISCLOSURE OF INVENTION

The object of the invention is to eliminate this problem and to provide an interface circuit which can be integrated and which provides a transparent connection for speech signals which can be switched on and off in a simple manner.

In a telephone line interface circuit of the type described in the introduction, this is achieved in an embodiment according to the invention in that said circuit comprises a cascade circuit, incorporated between the telephone set- and switching matrix terminals, of a first and a second bidirectional amplifier which are connected to each other via a common port, said cascade circuit behaving as an accurate one-to-N transformer for speech signals, and a third bidirectional amplifier, one port of which is connected in parallel to the common port of the first and second bidirectional amplifiers and the other port of which is terminated with an impedance such that a direct-voltage decoupling is obtained between the telephone set terminals and the switching matrix terminals.

In another embodiment according to the invention, this is achieved in that said circuit comprises a bidirectional amplifier incorporated between the telephone set- and switching matrix terminals, said one bidirectional amplifier forming a cascade circuit with another bidirectional amplifier at the other side of the switching matrix, which cascade circuit behaves as an accurate one-to-one transformer for speech signals, and yet another bidirectional amplifier, one port of which is connected in parallel to the switching matrix terminals of the one bidirectional amplifier and the other port is terminated with an impedance such that a directvoltage decoupling is obtained between the telephone set terminals and the switching matrix terminals.

Advantageously, a part of said circuit can be used for supplying the activation voltage or for detecting loop currents as a result of which the quiescent and speech states of the telephone set can be determined.

BRIEF DESCRIPTION OF DRAWINGS

The invention will be explained in more detail on the basis of some embodiments, reference being made to the drawings in which:

FIG. 6 shows the block diagram of a system for setting up a connection between two subscriber telephone sets with the insertion of a switching matrix and two interface circuits; and FIG. 7 shows a further embodiment of the system used in FIG. 6 with a variant of the interface circuit according to the invention.

BEST MODE FOR CARRYING OUT THE INVENTION

Figure 1:
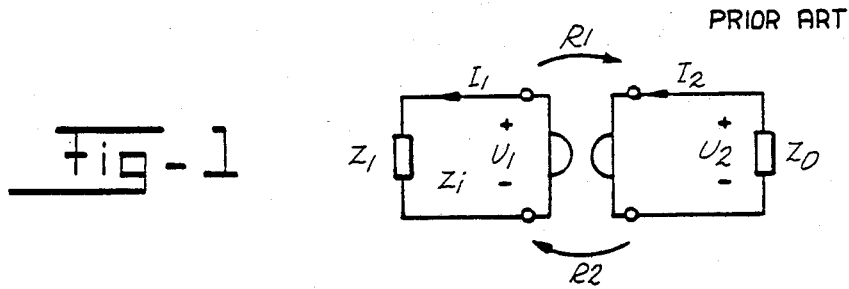
FIG. 1 shows the circuit diagram of a bidirectional amplifier.

The following applies to the circuit diagram, shown in FIG. 1, of a bidirectional amplifier:

$U1 = R1.I2$
$U2 = R2.I1$
$Zi = U1/I1 = -(R1.R2)/Z0$
$U2/U1 = -Z0/R1$
$I2/I1 = R2/Z0$

Figure 2:
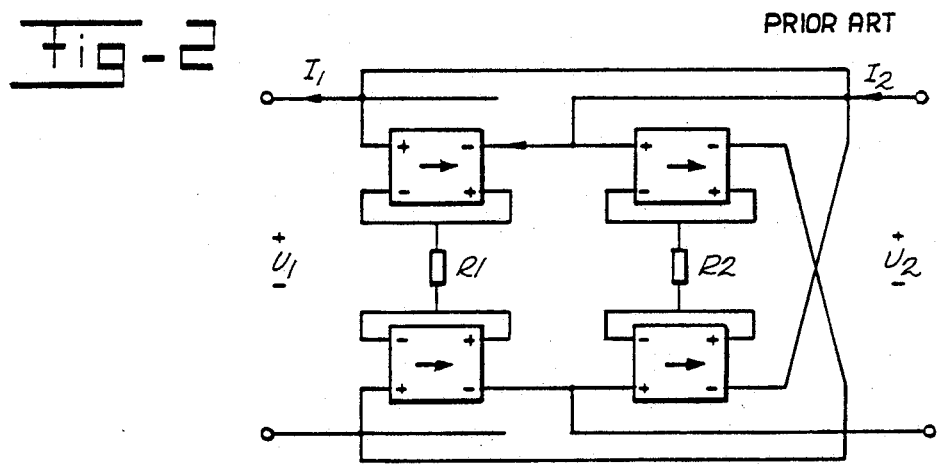
FIG. 2 shows a block diagram of a practical embodiment of a bidirectional amplifier.

In the block diagram shown in FIG. 2 of a practical embodiment of a bidirectional amplifier or gyrator, the blocks may be constructed, in a known manner, as balanced amplifiers which can easily be switched on and off.

Figure 3:
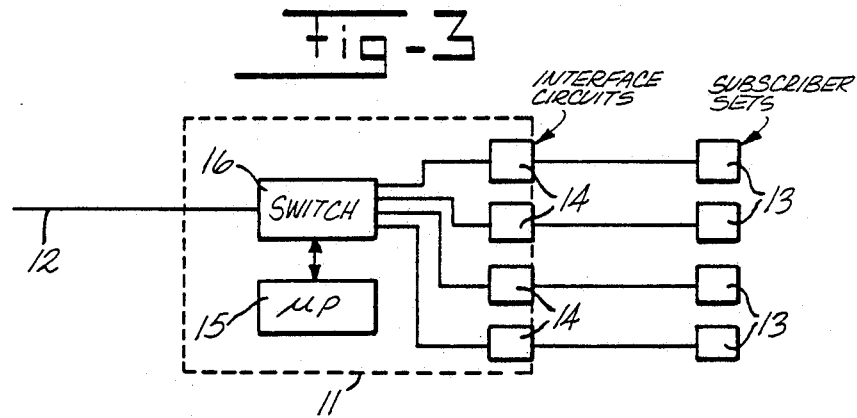
FIG. 3 shows the setting up of a call connection between a system line and an interface circuit with the insertion of a switching matrix.

FIG. 3 shows diagrammatically the block diagram of a small PABX system 11. The system line 12 is shown on the left and a number, in this case four, of subscriber telephone sets 13, each connected to a separate telephone line interface circuit 14, are shown on the right. A switching matrix 16, which is controlled by a microprocessor 15, is furthermore shown in the PABX.

Figure 4:
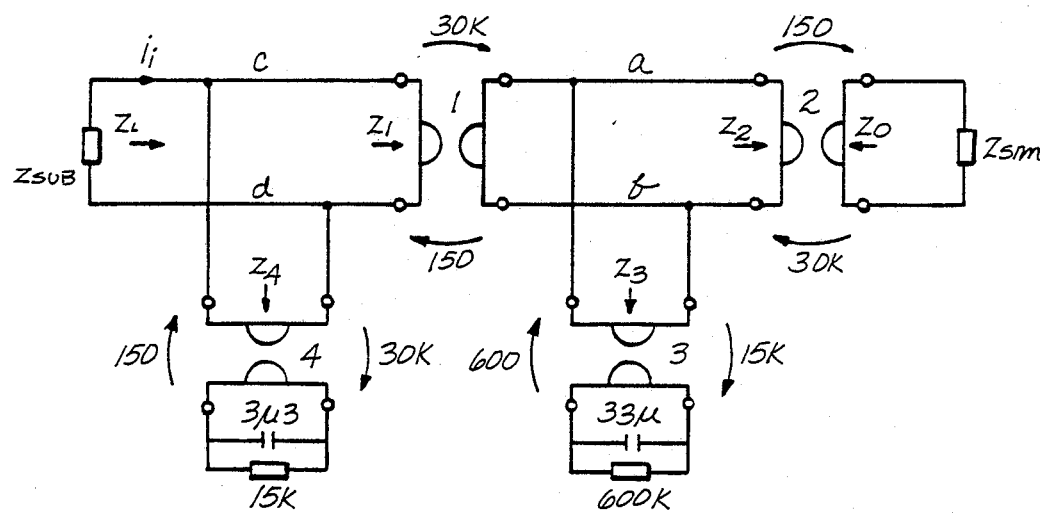
FIG. 4 shows a circuit diagram of an embodiment of the interface circuit according to the invention.

FIG. 4 shows a first embodiment of the interface circuit according to the invention. The cascade circuit of a bidirectional amplifier 1 and bidirectional amplifier 2 guarantees a completely transparent connection for speech signals in the band from 300 Hz to 3400 Hz. The impedance Z2 which can be seen on the lefthand side of the amplifier 2 is in fact equal to 30k.150/Zsm (sm=switching matrix). The impedance Z1 which can be seen on the lefthand side of the amplifier 1 is therefore equal to 30k.150/Z2 =Zsm. In the same manner, the impedance ZO which is seen on the righthand side of the amplifier 2 is equal to the impedance Zsub (subscriber=subscriber telephone set).

It is clear that the cascade circuit of the bidirectional amplifiers 1 and 2 behaves as a one-to-N transformer for speech signals, it being possible for N to be greater or less than, or equal to, one. Two of these cascade circuits (optionally separated by a connection line of the switching matrix) in series behave as a one-to-one transformer for speech signals.

The bidirectional amplifier 3 is added to achieve, under these circumstances, the galvanic separation with respect to the switching matrix which is obtained in the known circuit with the aid of large capacitors. A parallel circuit of a capacitor of 33 μ and a resistor of 600 k is incorporated at the output port. For low frequencies, said impedance at the output terminals of said amplifier 3 is equal to 600 k. The impedance Z3 which can be seen at the other side of the amplifier 4 is then equal to 15 k.600/600 k=15 ohm. Between the terminals a and b there is therefore a short circuit for DC, and this implies that the DC impedance Zi and the DC impedance ZO at the input and output respectively is very high (300 k). Normally, the parallel circuit of 33 μ and 600 k at the output of the amplifier 3 is converted into a series circuit of 15 ohm and 297 H. It is obvious that these resistance and capacitance values are only examples and that other values are possible.

An inductive nature is furthermore added to the impedance Zi, which can be seen between the subscriber telephone set lines, with the aid of the bidirectional amplifier 4. A parallel circuit of a 3.3μF capacitor and a 15 k resistor is incorporated at the output terminals thereof. Said parallel circuit is converted in the other direction into a series circuit of a 300 ohm resistor and a 14.85 H selfinductance. In this case, the low-frequency impedance Z4 at the input of the amplifier 4 is equal to 30 k.150/15 k =300 ohm. The output of the amplifier 4 is therefore short-circuited for high frequencies and the impedance Z4 is high.

Various modes of operation are possible with this interface circuit.

In the speech mode, a transparent speech connection for alternating current signals is achieved via the amplifiers 1 and 2. Here the amplifier 3 is used for the required direct-voltage decoupling and the amplifier 1, 4 or 5 (see FIG. 5) can be used for impressing the line voltage or activation voltage (ringing) through a suitable summing point in the amplifier.

In the activation mode (ringing), the amplifier 1 is switched off and the amplifier 4 provides the inductive nature, the state of the amplifiers 2 and 3 being neutral.

In the standby mode, the amplifier 2 is switched off and the amplifiers 1, 3 and 4 are switched on. In this case, a correct impedance can be presented to the subscriber telephone set in a simple manner, for example, with the aid of a further bidirectional amplifier 5, as shown in FIG. 5.

In this interface circuit according to the invention, the magnitude of the voltage across, and/or the current through, the telephone set for detection purposes can, moreover, be measured in a simple manner by measuring the current and/or voltage at the port of the amplifier 1, 4 or 5 not connected to the telephone set.

Thus, the "hook-on/hook-off" state can be detected by determining the loop current in the telephone set with the aid of the measurement of a low voltage at the other side of the amplifier 3. A separate measuring resistor such as that in the normal and known circuits is no longer necessary.

Figure 5:
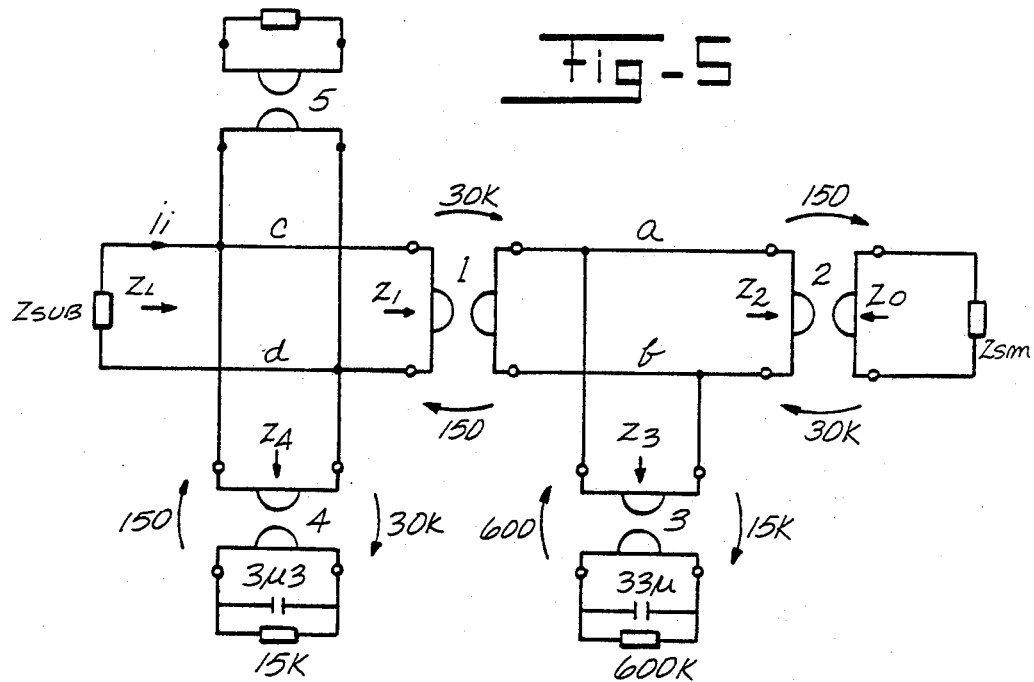
FIG. 5 shows the circuit diagram of a further embodiment of the interface circuit according to the invention.

Any voltage on the line can also be detected by measuring the current at one port of a bidirectional amplifier, a port of which is connected to the subscriber telephone set line, for example such as amplifier 5 as is shown in FIG. 5. This gives an indication of the voltage on the line.

Maximum line voltages and maximum line currents can also be monitored with the aid of said bidirectional amplifier 5 since these are now measured at a more measurable point.

In FIG. 6, the block diagram is given as an example of the setting up of a call connection between two subscribers via the said interface circuits according to the invention and a switching matrix. The two interface circuits 21, 22 are connected respectively to subscriber telephone set 1 and to subscriber telephone set 2. As also stated earlier, these two interface circuits 21, 22 form a one-to-one transformer for speech signals.

Furthermore, each interface circuit 21, 22 can be connected via one of the four switching matrix (or PABX) lines to one of the four (arbitrarily chosen number) connection lines c1 to c4. The other lines can therefore still be used to connect other interface circuits to each other. The switches shown in FIG. 6 are realized by making the amplifier 2 switchable in each interface circuit.

In the embodiment shown in FIG. 7 of the system in FIG. 6, a variant is used for the interface circuit. In the two interface circuits 23, 24 shown, the bidirectional amplifiers 2 are omitted and the amplifiers 1a, 1b and 3a, 3b are rendered switchable after they have been connected with a particular connection line. Here, too, the two interface circuits 23, 24 again form a one-to-one transformer for speech signals.

FIG. 7 also shows a further bidirectional amplifier 4a, 4b, one port of which is connected in parallel to the telephone set terminals, as in FIGS. 4 and 5. In FIG. 7, one port of yet another bidirectional amplifier 5a, 5b (not shown) may be connected in parallel, as in FIG. 5, to the telephone set terminals.

The various modes of operation as described in relation to FIGS. 4 and 5 are also possible with the circuit of FIG. 7.

If the connection is obtained in this last "simple" embodiment via one of the four connection lines c1 to c4, two bidirectional amplifiers are incorporated in the speech connection which again form a transparent connection. In this simple embodiment, a prerequisite is, however, that the corresponding resistors in the various interface circuits formed on a chip must be as equal to each other as possible. This is simpler in the more "extended" embodiment of FIG. 6 since the transfer is determined by the resistance ratios of resistors on the same chip.

We claim:

1. Telephone line interface circuit for connecting a telephone set to a switching matrix, said interface circuit comprising two telephone set terminals for
    coupling the interface to the telephone set,
    two switching matrix terminals for coupling the interface to one side of the switching matrix,
    a first bidirectional amplifier having a first port coupled to the telephone set terminals,
    a second bidirectional amplifier having a second port coupled to the switching matrix terminals, said first and second bidirectional amplifiers being connected in series via a common port to thereby provide a one-to-N speech transformer between said first port and said second port, and
    a third bidirectional amplifier, one port of which is connected in parallel to said common port and the other port of which is terminated with a first impedance such that a direct-voltage decoupling is obtained between the telephone set terminals and the switching matrix terminals.

2. Interface circuit according to claim 1, further comprising
   a fourth bidirectional amplifier, one port of which is connected in parallel to the telephone set terminals and the other port of which is terminated with a second impedance such that a pre-defined impedance appears in parallel to the telephone set terminals, and
   means for applying a direct voltage or direct current at a suitable summing point in the first or in the fourth bidirectional amplifier to thereby provide the telephone set with the required line voltage.

3. Interface circuit according to claim 2, further comprising
   means for applying an alternating voltage or alternating current at a suitable summing point in the first or fourth bidirectional amplifier to thereby provide the telephone set with the required activation voltage.

4. Interface circuit according to claim 3, wherein said means for applying an alternating voltage further comprises
   a fifth bidirectional amplifier, one port of which is connected in parallel to the telephone set terminals and the other port of which is terminated with a resistor.

5. Interface current according to claim 2, wherein the magnitude of the voltage across and/or the current through the telephone set is measured by measuring the current and/or voltage at a port of the first or fourth bidirectional amplifier not connected to the telephone set.

6. Telephone line interface circuit for connecting a first set to a second telephone set via a switching matrix and a second such interface circuit, the first telephone line interface circuit comprising
   two telephone set terminals for coupling the first interface circuit to the first telephone set,
   two switching matrix terminals for coupling the first interface circuit to a first side of the switching matrix,
   a first bidirectional amplifier having a first port coupled to the telephone set terminals and a second port coupled to the switching matrix terminals, such that when the second port of said first bidirectional amplifier is connected via the switching matrix to the second interface circuit comprising a second bidirectional amplifier substantially identical to the first bidirectional amplifier, there is provided a one-to-one speech transformer circuit between said first port and a corresponding first port said second bidirectional amplifier, and
   a third bidirectional amplifier, one port of which is connected in parallel to said second port and the other port is terminated with a first impedance such that a direct-voltage decoupling is obtained between the telephone set terminals and the switching matrix terminals.

7. Interface circuit according to claim 6, further comprising
   a fourth bidirectional amplifier, one port of which is connected in parallel to the telephone set terminals of said first interface circuit and the other port of which is terminated with a second impedance such that a pre-defined impedance appears in parallel to the telephone set terminals, and
   means for applying a direct voltage or direct current at a suitable summing point in the first or in the fourth bidirectional amplifier to thereby provide the first telephone set with the required line voltage.

8. Interface circuit according to claim 7, further comprising
   means for applying an alternating voltage or alternating current at a suitable summing point in the first or fourth bidirectional amplifier to thereby provide the first telephone set with the required activation voltage.

9. Interface circuit according to claim 8, wherein said means for applying an alternating voltage further comprises
   a fifth bidirectional amplifier, one port of which is connected in parallel to the telephone set terminals and the other port of which is terminated with a resistor.

10. Interface circuit according to claim 9, wherein the magnitude of the voltage across and/or the current through the first telephone set is measured by measuring the current and/or voltage at the port of the first or fourth or fifth bidirectional amplifier not connected to the telephone set.

11. System provided with at least two interface circuits according to claim 1, a first such interface circuit being provided at the one side of the switching matrix and a second such interface circuit being provided at a second side of the switching matrix, to thereby provide a one-to-one speech transformer circuit between the first port of the first interface circuit and the first port of the second interface circuit.

* * * * *